Patented Dec. 12, 1944

2,365,050

UNITED STATES PATENT OFFICE 2,365,050

SEPARATION OF LIQUIDS OF DIFFERENT BOILING POINTS FROM MIXTURES THEREOF BY FRACTIONAL DISTILLATION

William James Chadder, Guildford, England, assignor to Woodall-Duckham (1920) Limited, Guildford, England, a British company No Drawing. Application March 24, 1942, Serial No. 436,054. In Great Britain August 6, 1940

4 Claims. (Cl. 202—40)

This invention relates to improvements in the separation of liquids of different boiling points from mixtures thereof by fractional distillation.

The method of the present invention is especially applicable to the separation of mixtures of hydrocarbon liquids for example, to the separation of pure toluole from washed raw toluole containing both benzole and xylole. In referring in this specification to "pure" products, it is not intended to imply chemically pure benzene or toluene or the like, but products such as the following, which are defined in the National Benzole Association's "Standard Specifications for Benzole and Allied Products," 2nd edition, 1938, as—

Pure benzole distilling from 5-95% within 0.5° C.
Pure benzole for nitration distilling from 5-97% within 0.4° C.
Pure toluole distilling from 5-95% within 1.0° C.
Pure toluole for nitration distilling from 5-97% within 0.4° C.

The reference to National Benzole Association requirements does not, however, preclude the recovery of products of even higher purity.

If, for example, a washed raw toluole as abovementioned is distilled in the conventional manner in a batch still equipped with a fractionating column of practical design, with a total condenser for the distillate vapours leaving the column, and with a system for returning reflux to the column, then it is found that the pure hydrocarbons benzole, toluole and xylole in the raw material cannot be separated completely and distinctly from one another and that in passing progressively from the withdrawal of pure benzole to pure toluole and from pure toluole to pure xylole, intermediate fractions consisting on the one hand of a mixture of benzole and toluole and on the other hand of toluole and xylole are unavoidably produced.

In the same way, in the distillation of a mixture of liquids A and B, or of liquids A, B and C, an "intermediate fraction" consisting of A and B is produced in passing from the distillation of A to B, and an "intermediate fraction" of B and C is produced in passing from the distillation of B to C.

The amounts of the intermediate fractions vary according to the design and method of operating the apparatus but they frequently represent a substantial proportion of the batch of raw material charged to the still. Since during the withdrawal of the intermediate fraction the rate of production is reduced, (i. e., the reflux ratio is increased) and since the intermediate fractions must either be redistilled with subsequent batches of raw material or disposed of in admixture with some less refined product, the operating efficiency of the distillation process is impaired causing wastage of refined products, fuel, cooling water, time and labour.

The object of the present invention is to enable the volume of the intermediate fraction to be reduced by a substantial amount, leading to a corresponding increase in the amount of refined products recovered during each distillation, and also enables the intermediate fraction to be withdrawn more quickly.

The present invention provides a method of removing intermediate fractions in the separation of liquids of different boiling points from mixtures thereof by fractional distillation in a batch still having a fractionating column associated with a total condenser for the distillate and a reflux liquid circuit, according to which method, when it is found that, with the continued withdrawal of products, the temperature of the vapour at the outlet of the column begins to rise above the distillation temperature of the pure liquid being distilled (showing that an intermediate fraction comprising a mixture of this liquid and the next higher-boiling liquid is present in the upper part of the column, in an amount which in any given column and in given conditions of operation is predetermined and is sensibly constant), the withdrawal of products is stopped and all condensate is returned to the column as reflux, until a condition of equilibrium is established in the column which is indicated by the attainment of a steady vapour temperature at the head of the column, and when equilibrium is established the return of reflux to the column is interrupted for one or more short periods during which the intermediate mixture distilling over is withdrawn from the system at the full optimum distillation rate of the still, and between such periods of withdrawal of intermediate fraction, if more than one, all the condensate is returned as reflux to the column for so long a time as is necessary to re-establish equilibrium conditions in the column, the withdrawal of the intermediate mixture in one or more portions as described being continued until the whole of the predetermined amount of the intermediate fraction, determined as hereinafter described, and any intermediate mixture in the reflux circuit is removed from the system, whereupon the condensate is again proportioned between product and reflux in amounts appropriate to the given mixture and apparatus, and distillation is continued.

It is important that the intermediate mixture present in the reflux circuit associated with the column should be removed therefrom simultaneously with the mixture from the column, and not returned to contaminate the upper part of the column.

Examination of the liquid lying on the trays of a well operated and efficient fractionating column will show that when the vapour temperature at the outlet of the column continues to rise above that of the pure liquid fraction last withdrawn, the still has become exhausted of that liquid and that all of it yet remaining in the system is to be found in admixture with some of the next higher-boiling pure liquid on the upper trays of the column, the concentration of the lower-boiling liquid being greatest on the uppermost tray, and decreasing to a negligible amount on some tray lower in the column. The amount of the liquid mixture which must be removed from the column in order to eliminate an amount of the lower-boiling liquid sufficient to prevent undesired contamination of the succeeding higher-boiling pure liquid is herein referred to as "the predetermined amount of the intermediate fraction." For all practical purposes it may be assumed that the total volume of intermediate fraction which need be withdrawn from a well-designed fractionating column containing say thirty trays will be of the order of 50% to 75% of the volumetric working capacity of all the trays in the column, plus the quantity of liquid contained in the reflux circuit. This quantity of intermediate fraction will be smaller if the column has a larger number of trays, and conversely. Similarly, the quantity of the intermediate fraction will be reduced, the smaller the volumetric capacity of the reflux system. Where it is desired to determine more accurately the minimum quantity of the intermediate fraction it is necessary to withdraw from a particular system, this may be done by testing, in a well-known manner in Engler distillation apparatus, the liquids lying on the individual trays of the column, the samples from the trays being withdrawn simultaneously when the vapour temperature at the head of the column tends persistently to rise above the boiling point of the pure liquid hitherto being withdrawn. The Engler distillation test will indicate at which tray the quantity of the lower-boiling component present thereon will cease to have a contaminating effect on the total volume of the next higher-boiling pure liquid to be withdrawn from the system; all the liquid present in the column above the tray in question, together with the liquid in the reflux circuit, should be regarded as the volume of the intermediate fraction of the two pure liquids which it is essential to withdraw from the system.

In the case of a packed column the predetermined amount of intermediate fraction to be withdrawn is determined by calculating the liquid hold-up in the filling over a suitable height of the upper part of the column.

In each of the following examples the ratio in which the condensate was divided between reflux and product was accurately and immediately determinable by the operation of a valve in the pipe-line delivering reflux to the column; any condensate not returned as reflux automatically becomes the product fraction. A liquid meter is preferably provided in both the reflux and product pipe-lines.

Example 1

The following is an example of the application of the invention to the distillation of a raw toluole containing, say,

| | Percent |
|---|---|
| Benzole | 15 |
| Toluole | 75 |
| Xylole | 5 |
| Higher-boiling hydrocarbons | 5 |

Assuming the still is in normal operation and distilling at the rate of 1000 gallons per hour of total distillate, the first fraction to come over will be the benzole, during which time the temperature at the head of the column will be steady at 80° C. When even at a very slow rate of product withdrawal, the temperature at the head of the column begins to rise, the withdrawal of benzole from the apparatus is discontinued, and all the condensate is returned to the column as reflux (i. e., a condition of total reflux), until the temperature at the head of the column returns to 80° C. If upon the resumption of withdrawal of product the temperature at the head of the column still shows a tendency to rise, it may be assumed that preparation should now be made to withdraw the intermediate fraction, and the first step is to restore conditions of total reflux. Total reflux is continued until the composition of the liquid on the various trays in the column is static, which is indicated by the attainment of a steady vapour temperature at the head of the column, and in a column capable of the above performance, this condition should be attained within one hour. From experiment it has been found that the predetermined amount of intermediate fraction to be removed is, say, 150 gallons. A portion of the intermediate fraction is now withdrawn by interrupting the return of reflux for a period of a few minutes (say for three minutes) and draining from the apparatus to a separate receiver the total condensate produced in this period. A quantity of, e. g., 50 gallons may be removed in this way. The return of reflux to the column is now restored, the total amount of condensate being returned and none being withdrawn as product. Return of the reflux is continued until equilibrium is re-established in the column; the time necessary for this may be of the order of twenty minutes or more. A further 50 gallons of intermediate fraction is then withdrawn by stopping the return of reflux and withdrawing the total condensate as before, and at the end of this second withdrawal the total condensate is again returned to the column as reflux until equilibrium is re-established therein. The process is repeated and a third batch of intermediate fraction is removed, thus making up the 150 gallons it was desired to remove. The quantity withdrawn at each time and the number of withdrawals will depend on the conditions in any particular apparatus. After the removal of all the intermediate fraction, the temperature at the head of the column will have risen to 109/110° C. indicating that the pure toluole is beginning to distil over. Part of the condensate is now diverted to the toluole receiver, and the remainder returned as reflux to the column. The temperature at the head of the column should remain steady during the distillation of the toluole.

Example 2

The following is another example of the application of the invention to the distillation of washed raw toluole containing approximately—

| | Per cent |
|---|---|
| Benzole | 20 |
| Toluole | 70 |
| Xylole and residue | 10 |

The still was charged with 7000 gallons of the above washed raw toluole, indirect steam heating was turned on and slowly increased until within 5 hours under conditions of total reflux the plant had reached its optimum distillation rate. During the following 9 hours at a progressively reduced rate of withdrawal (i. e., progressively increasing reflux ratio), 1300 gallons of benzole containing approximately 12 gallons of toluole were collected, and during this period the temperature at the head of the column had slowly increased from 80° C. to 81° C. During the 8th hour of benzole production, at a product withdrawal rate of as little as 20 to 30 gallons per hour, there was a tendency for the temperature at the head of the column to rise and for periods of 10 to 15 minutes the withdrawal of benzole was stopped, all distillate being returned to the column as reflux. At the end of the 9th hour on benzole production, preparations were made for the withdrawal of the benzole/toluole intermediate fraction and a condition of total reflux was maintained for one hour.

It was known that the total volume of liquid held on the trays of the column amounted to approximately 350 gallons. It had previously been found, in similar conditions of distillation, by testing the distillation characteristics of the liquid on the individual trays of the column that the elimination from the system of approximately 200 gallons of the liquid then in the column should suffice to remove any benzene likely to contaminate the succeeding toluole product.

The intermediate fraction amounting totally to 200 gallons was thereupon withdrawn in 4 batches of approximately 50 gallons, each withdrawal being made in approximately 3 minutes at the optimum full distillation rate of the plant. Between each period of intermediate fraction withdrawal, and after withdrawal of the final batch, a condition of total reflux was restored in the column for approximately 1 hour, to establish a condition of equilibrium therein, and during these times no product was withdrawn.

The temperature at the head of the column had now risen in comparatively sharp steps to about 110° C. and a test of the distillate indicated that the withdrawal of product could now be resumed and collected in the toluole receivers. This was done, slowly at first, increasing to a peak period of withdrawal (i. e., low reflux ratio) and then decreasing gradually to a lower rate of withdrawal (i. e., comparatively higher reflux ratio) until after 20 hours approximately 4500 gallons of nitration quality toluole distilling 5% to 97% in less than 0.2° C. had been collected.

At this stage the steam supply was closed, the still allowed to cool and a further charge of about 6000 gallons of washed raw toluole was delivered into the still.

Steam heating was again applied slowly until within approximately 5 hours under conditions of total reflux the optimum distillation ratio had been attained.

Thereafter during a period of approximately 9 hours, 1100 gallons of benzole containing about 10 gallons of toluole were withdrawn in conditions similar to those described above for the removal of the benzole fraction.

A period of 5 hours again sufficed for the removal of 200 gallons of benzole/toluole intermediate fraction in 4 batches of 50 gallons and for the re-zoning of the column as described above in the first distillation, and during the succeeding period of 20 hours, 4300 gallons of nitration quality toluole were collected.

During the 19th and 20th hours on nitration toluole with full indirect steam heating, the total distillation rate fell progressively to approximately ⅓ of the normal optimum rate, and a test of the product showed that the distillation range of the toluole fraction was tending to widen. Thereupon all distillate was returned to the column as reflux for approximately one hour. Open steam was slowly supplied to the spray pipe in the base of the still to increase the rate of distillation, the condensate now being passed through the condensate separator to remove condensed water from the reflux and product. The temperature at the head of the column had now reached and remained steady at 126° C. A batch of 100 gallons of toluole/xylole intermediate fraction was then withdrawn, and was followed by a period of 30 minutes of total reflux, after which a further batch of 100 gallons of toluole/xylole intermediate fraction was withdrawn, and this was followed by a further period of approximately 30 minutes of total reflux to stabilize conditions in the system. A test of the distillate at this stage showed that no further toluene was present in the system and steam distillation was continued for a period of 4 hours during which time 750 gallons of xylol and naphtha were withdrawn and delivered to the motor benzole receiver. Distillation was discontinued when a distillation test of the residue (then amounting to approximately 450 gallons) showed it to be stripped suitably of hydrocarbons.

The plant was then closed down and the residue pumped away.

The balance of products recovered during the two distillations described above was as follows:

*First charge 7000 gallons washed raw toluole*

| | Benzole | Toluole | Xylole, naphtha and residue | Total |
|---|---|---|---|---|
| 1st benzole | 1,288 | 12 | | 1,300 |
| 1st benzole/toluole intermediates | 112 | 88 | | 200 |
| 1st toluole | | 4,500 | | 4,500 |

*Second charge 6000 gallons washed raw toluole*

| | Benzole | Toluole | Xylole, naphtha and residue | Total |
|---|---|---|---|---|
| 2nd benzole | 1,090 | 10 | | 1,100 |
| 2nd benzole/toluole intermediates | 110 | 90 | | 200 |
| 2nd toluole | | 4,300 | | 4,300 |
| Toluole/xylole intermediates | | 100 | 100 | 200 |
| Naphtha | | | 750 | 750 |
| Residue | | | 450 | 450 |
| | 2,600 | 9,100 | 1,300 | 13,000 |

In the distillation of each charge the time occupied for the withdrawal of the benzole/toluole intermediate fraction amounted to approximately 5 hours only. Less than 3% of the volume of each charge was withdrawn in the form of benzole/toluole intermediate fraction.

The volume of toluole/xylole intermediate fraction amounted to 1.5% of the total raw material charged to the still in the two operations.

Of the total toluene contained in the washed raw material 96.7% by volume was recovered in the form of toluole for nitration.

The benzole fraction contained 0.92% by volume of toluole or 0.24% by volume of the total toluene present in the raw material.

Of the total toluene present in the raw material only 1.96% by volume passed away with the benzole/toluole intermediate fraction, its concentration in that fraction representing 44.5%.

Of the total toluene present in the raw material only 1.1% by volume passed away with the toluole/xylole intermediate fraction, its concentration in that fraction representing 50%.

In practice, when distilling washed raw toluole, it has been found possible by the use of the method of the present invention to limit the amount of the intermediate benzole/toluole fraction to 3% or less of the initial charge in the still, as compared with an intermediate fraction amounting to 18 or 20% of the still charge when the present invention is not employed.

If the apparatus is used mainly for the rectification of washed toluole an intermediate fraction of toluole/xylole need not be taken from each batch. Instead the distillation of the first batch is stopped shortly before the whole of the pure toluole is exhausted; the still is then allowed to cool and a further batch of washed toluole is charged on to the residue remaining in the still and the above-described procedure is repeated. This process of "topping up" may be effected one or more times, after which, following the removal of the pure toluole, a similar procedure for the withdrawal of the toluole/xylole intermediate fraction is carried out prior to the collection of xylole or naphtha. In this way also the toluole/xylole intermediate fraction can be limited to about 3% of the volume of the final charge contained in the still or to a smaller percentage if expressed by volume on the total volume of washed raw material from which it is recovered.

The invention is also of particular value in the treatment of washed raw toluole of low specific gravity rich in non-aromatic non-olefinic hydrocarbons. Impurities of this character may have boiling points intermediate between benzole and toluole and between toluole and xylole respectively, and tend to increase the total volume of the intermediate fractions.

In the first place the application of the invention to the distillation of such raw material reduces the overall volume of the intermediate fractions. In the second place the present invention still further reduces the volume of the intermediate fractions requiring re-processing in the following manner. Of the intermediate fraction between benzole and toluole, the early part, which contains much benzole and some impurities, and the last part which contains much toluole and some impurities, are collected separately from the intervening portion which contains mainly the undesired impurities. The first and last fractions just referred to are then redistilled, for example, with later batches of raw benzole or of raw toluole, for the recovery of further quantities of benzole and toluole. Similar treatments may be applied to the intermediate fraction between toluole and xylole.

The present invention is not, of course, limited in its applicability to the fractionation of mixtures of aromatic hydrocarbons, but is of general applicability to the separation of mixtures of liquids of different boiling points in apparatus of the kind described in the specification and claims.

What I claim is:

1. Method for the removal of intermediate fractions in the separation of liquids of different boiling points from mixtures thereof by fractional distillation by a batch process in a batch still having a fractionating column associated with a total condenser and a reflux circuit for returning reflux liquid to the column, comprising the following sequence of steps: stopping completely the withdrawal of product when the temperature of the vapour at the outlet of the column begins to rise above the distillation temperature of the pure product then being distilled; returning all condensate to the column as reflux until a condition of equilibrium is established in the column; interrupting completely the return of reflux to the column and simultaneously removing the intermediate fraction from the column and from the reflux circuit; repeating the last-mentioned two steps in order as often as necessary until the total predetermined amount of intermediate fraction is removed from the system; and re-apportioning the condensate between product and reflux in amounts appropriate to the liquid mixture under treatment and to the apparatus.

2. Method for the removal of intermediate fractions in the separation of liquids of different boiling points from mixtures thereof by fractional distillation by a batch process in a batch still having a fractionating column associated with a total condenser and a reflux liquid circuit, comprising the following sequence of steps: stopping completely the withdrawal of product when the temperature of the vapour at the outlet of the column begins to rise above the distillation temperature of the pure product then being distilled; returning all condensate to the column as reflux until a condition of equilibrium is established in the column; interrupting completely for a short period the return of reflux liquid to the column and simultaneously withdrawing at the full optimum distillation rate of the still the intermediate fraction distilling over; repeating the last-mentioned two steps in order until the whole of the predetermined amount of the intermediate fraction and any intermediate fraction in the reflux liquid circuit is removed from the system; and finally re-apportioning the condensate between product and reflux in amounts appropriate to the liquid mixture under treatment and to the apparatus.

3. Method for the separation of liquid mixtures containing three main components of different boiling points, comprising applying the method of claim 1 to the removal of the intermediate fraction between the lowest-boiling and the middle components, distillation being continued until the system is substantially exhausted of the middle component, whereupon a further batch of the mixed liquids is charged into the still, and the operations are repeated as often as desired, and the method of claim 1 is then applied to eliminate the intermediate fraction between the middle and the highest-boiling components, prior to the collection of the highest-boiling component.

4. In the method for the removal of intermediate fractions in the separation of liquids of different boiling points from mixtures thereof as claimed in claim 1, the feature of collecting the intermediate fraction in separate portions, including a first portion rich in the lower-boiling liquid and a last portion rich in the higher-boiling liquid, and submitting the said first and last portions to redistillation.

WILLIAM JAMES CHADDER.